US008465584B2

(12) United States Patent
Nieberle et al.

(10) Patent No.: US 8,465,584 B2
(45) Date of Patent: *Jun. 18, 2013

(54) AQUEOUS SUSPENSIONS OF FINE-PARTICULATE FILLERS, METHOD FOR THE MANUFACTURE THEREOF AND USE THEREOF FOR THE MANUFACTURE OF PAPERS CONTAINING FILLERS

(75) Inventors: Joerg Nieberle, Wachenheim (DE); Anton Esser, Limburgerhof (DE)

(73) Assignee: BASF SE, Ludwigshafen (DE)

( * ) Notice: Subject to any disclaimer, the term of this patent is extended or adjusted under 35 U.S.C. 154(b) by 51 days.

This patent is subject to a terminal disclaimer.

(21) Appl. No.: 13/130,841

(22) PCT Filed: Nov. 30, 2009

(86) PCT No.: PCT/EP2009/066010
§ 371 (c)(1),
(2), (4) Date: May 24, 2011

(87) PCT Pub. No.: WO2010/063658
PCT Pub. Date: Jun. 10, 2010

(65) Prior Publication Data
US 2011/0230601 A1   Sep. 22, 2011

(30) Foreign Application Priority Data

Dec. 3, 2008 (EP) .................................. 08170590

(51) Int. Cl.
*C08L 3/02* (2006.01)
*C08F 230/02* (2006.01)
*C08F 20/06* (2006.01)
*C08F 22/12* (2006.01)
*C08F 220/46* (2006.01)
*C08F 212/10* (2006.01)

(52) U.S. Cl.
USPC ............ 106/501.1; 106/499; 524/48; 524/53; 524/560; 524/565; 526/277; 526/317.1; 526/329.3; 526/342; 526/347; 162/158; 162/168.1; 162/168.2; 162/175; 162/181.1

(58) Field of Classification Search
USPC ................ 162/158, 164.6–164.7, 168.1–2, 162/168.7, 169, 175, 185, 181.1–181.8; 524/48, 524/53, 543, 556, 560–565; 526/274, 314.3, 526/277, 317.1, 318.3–318.4, 327, 328, 328.5–329, 341, 342; 516/346, 347; 428/403, 428/407
See application file for complete search history.

(56) References Cited

U.S. PATENT DOCUMENTS

| | | | | |
|---|---|---|---|---|
| 4,171,407 A * | 10/1979 | Elser et al. | | 428/500 |
| 5,147,907 A | 9/1992 | Rinck et al. | | |
| 6,080,802 A * | 6/2000 | Emmons et al. | | 523/205 |
| 7,074,845 B2 * | 7/2006 | Laleg | | 524/47 |
| 7,211,608 B2 * | 5/2007 | Niinikoski | | 523/202 |
| 8,197,641 B2 * | 6/2012 | Esser et al. | | 162/169 |
| 8,227,529 B2 * | 7/2012 | Esser et al. | | 524/48 |
| 2006/0024262 A1 | 2/2006 | Hahnle et al. | | |
| 2006/0037725 A1 | 2/2006 | Hahnle et al. | | |
| 2008/0210394 A1 * | 9/2008 | Mahr et al. | | 162/162 |
| 2010/0038046 A1 | 2/2010 | Mongoin et al. | | |
| 2010/0179248 A1 | 7/2010 | Esser et al. | | |
| 2010/0181037 A1 | 7/2010 | Esser et al. | | |
| 2010/0181038 A1 | 7/2010 | Esser et al. | | |
| 2010/0186915 A1 | 7/2010 | Esser et al. | | |
| 2011/0048660 A1 | 3/2011 | Esser et al. | | |
| 2011/0079365 A1 | 4/2011 | Haehnle et al. | | |
| 2011/0100575 A1 | 5/2011 | Schmidt-Thuemmes et al. | | |
| 2011/0108226 A1 | 5/2011 | Schmidt-Thuemmes et al. | | |

FOREIGN PATENT DOCUMENTS

| | | |
|---|---|---|
| DE | 198 21 089 | 11/1999 |
| WO | 03 074786 | 9/2003 |
| WO | 03 087472 | 10/2003 |
| WO | 2005 012637 | 2/2005 |
| WO | WO 2006128814 A1 * | 12/2006 |
| WO | 2008 044118 | 4/2008 |
| WO | 2009 004079 | 1/2009 |
| WO | WO 2009/047233 A1 | 4/2009 |
| WO | 2010 000726 | 1/2010 |
| WO | 2010 000728 | 1/2010 |

OTHER PUBLICATIONS

Machine translation of WO 03/074786, The European Patent Office, [online], [retrieved on Sep. 5, 2012]. Retrieved from the Internet: <URL: http://translationportal.epo.org/emtp/translate/?ACTION=description-retrieval&COUNTRY=WO&FORMAT=docdb&KIND=A1&LOCALE=en_EP&NUMBER=03074786&OPS=ops.epo.org&ENGINE=google&SRCLANG=de&TRGLANG=en>.*
Machine translation of DE 19821089, The European Patent Office, [online], [retrieved on Sep. 5, 2012-09]. Retrieved from the Internet: <URL: http://translationportal.epo.org/emtp/translate/?ASTION=description-retrieval&COUNTRY=DE&FORMAT=docdb&KIND=A1&LOCALE=en_EP&NUMBER=19821089&OPS=ops.epo.org&ENGINE=google&SSCLANG=de&TRGLANG=en>.*
MSDS for Titanium Dioxide (Chemical Book), 2008, [online], [retrieved on Aug. 25, 2012], Retrieved from the Internet: <URL: http://www.chemicalbook.com/ProductMSDSDetailCB7461626_EN.htm>.*
U.S. Appl. No. 13/502,885, filed Apr. 19, 2012, Esser.
International Preliminary Report on Patentability and Written Opinion issued May 31, 2011 in PCT/EP2009/065535.
U.S. Appl. No. 13/147,623, filed Aug. 3, 2011, Esser, et al.
International Search Report issued May 3, 2010 in PCT/EP09/066010 filed Nov. 30, 2009.

* cited by examiner

*Primary Examiner* — Mark Halpern
*Assistant Examiner* — Dennis Cordray
(74) *Attorney, Agent, or Firm* — Oblon, Spivak, McClelland, Maier & Neustadt, L.L.P.

(57) ABSTRACT

An aqueous slurry of finely divided fillers which are at least partly coated with anionic latices, wherein the slurry is obtainable by treating an aqueous slurry of finely divided fillers with an aqueous dispersion comprising at least one anionic latex and at least one degraded starch, preparation of the aqueous slurries and their use as an additive to the paper stock in the production of filler-containing paper, filler-containing cardboard or filler-containing board by draining the paper stock.

17 Claims, No Drawings

AQUEOUS SUSPENSIONS OF FINE-PARTICULATE FILLERS, METHOD FOR THE MANUFACTURE THEREOF AND USE THEREOF FOR THE MANUFACTURE OF PAPERS CONTAINING FILLERS

The invention relates to aqueous slurries of finely divided fillers which are at least partly coated with polymers, processes for their preparation and their use as an additive to the paper stock in the production of filler-containing paper, filler-containing cardboard and filler-containing board having high dry strength.

In the production of filler-containing papers, the filler slurry is added to the fiber suspension before the latter is transferred to the former of the paper machine. A retention aid or a retention aid system is as a rule added to the filler/fiber suspension in order to retain as much filler as possible in the paper sheet. The addition of the filler to the paper enables the papermaker to achieve numerous improvements in the sheet properties. These include properties such as the opacity, whiteness, haptic properties and printability.

If, moreover, the filler is cheaper than the fiber, the addition or increased addition of filler can lead to a reduction of the fiber content and hence to a reduction of the production costs of the paper. Filler-containing papers or papers having a particularly high filler content can be more easily dried than papers containing no filler or papers having a relatively low filler content. As a consequence of this, the paper machine can be operated faster and with lower steam consumption, which both increases the productivity and reduces the costs.

However, the addition of filler to the fiber suspension also has disadvantages which can be compensated only partly by the addition of further paper assistants. For a given basis weight, there are limits with regard to the amount of filler which can be used. The strength properties of the paper are usually the most important parameters which limit the amount of filler in the paper. Other factors too, such as the filler retention, the draining of the paper stock suspension and any increased chemical requirement in retention and sizing can play a role here.

The loss of strength properties of paper can in some cases be completely or partly compensated by the use of dry and wet strength agents. A customary procedure in this case is the addition of cationic starch as a dry strength agent to the paper stock. Synthetic dry and wet strength agents, for example based on cationic or anionic polyacrylamides, are also used. The amount added and the strengthening effect are, however, limited in most cases. To the same extent, the compensating effect with respect to the loss of strength by increasing the filler and hence also the filler increase which can be realized at all are also limited. Moreover, not all strength properties are enhanced to the same extent and in some cases are enhanced at all only to an insufficient extent by the use of dry strength agents. An important example of this is the tear strength, which is influenced only slightly by the use of starch or synthetic dry strength agents in comparison with other strength parameters. The increase in the filler content in the paper on the other hand has as a rule a very great adverse effect on the tear strength.

Further important properties are the thickness and the stiffness of the paper. The increase in the filler content with the same basis weight leads to an increase in the paper density and a decrease in the thickness of the paper sheet. The latter leads to a considerable decrease in the paper stiffness. This decrease in the paper stiffness cannot in many cases be compensated solely by the use of dry strength agents. Frequently, additional measures, such as, for example, a reduction in the mechanical pressure in the press section in the smoothing units, in calendars or in the dry section of the paper machine, are required. The latter completely or partly compensates the loss of thickness by an increase in filler.

WO-A-03/074786 discloses aqueous slurries of finely divided fillers which are least partly coated with polymers. These polymers are binders for paper coating slips, whose glass transition temperature is in the range from −40 to +50° C. and is preferably below 6° C. The binder used in the examples has a glass transition temperature of 5° C.

The unpublished European application with the application number 08159619.9 discloses aqueous slurries of finely divided fillers which are least partly coated with anionic latices having a glass transition temperature of from −5 to −50° C.

The likewise unpublished European application with the application number 08159631.4 discloses aqueous slurries of finely divided fillers which are at least partly coated with anionic latices which comprise at least one monomer comprising phosphonic and/or phosphoric acid groups.

It was therefore the object of the invention to provide further aqueous slurries of finely divided fillers which, in paper production, compared with the known slurries, give papers having an improved breaking length and printability. In addition, the papers produced by the process according to the invention should have a high filler content and high dry strength.

The object is achieved, according to the invention, by aqueous slurries of finely divided fillers which are least partly coated with anionic latices, the slurries being obtainable by treating aqueous slurries of finely divided fillers with an aqueous dispersion comprising at least one anionic latex and at least one degraded starch.

The aqueous slurries according to the invention comprise, for example, from 1 to 70% by weight, preferably from 5 to 50% by weight, particularly preferably from 10 to 40% by weight, of at least one finely divided filler. The amount of the aqueous dispersion comprising at least one anionic latex and at least one degraded starch is, for example, from 0.01 to 10% by weight, preferably from 0.1 to 5% by weight, particularly preferably from 0.2 to 3% by weight, solids content of the aqueous dispersion based on the filler. The ratio of anionic latex to degraded starch is, for example, from 30:1 to 1:1, preferably from 10:1 to 1:1 and particularly preferably from 5:1 to 1:1.

The invention also relates to a process for the preparation of the aqueous slurries, from 0.01 to 10% by weight of an aqueous dispersion comprising at least one anionic latex and at least one degraded starch, solids content of the dispersion based on filler, being added to an aqueous slurry of at least one finely divided filler, or the aqueous slurry of at least one finely divided filler being introduced into an aqueous dispersion comprising at least one anionic latex and at least one degraded starch and the constituents being mixed in each case.

The invention furthermore relates to the use of the aqueous slurries described above as an additive to the paper stock in the production of filler-containing paper, filler-containing cardboard or filler-containing board having high dry strength by draining the paper stock.

In the context of the present invention, the term latex is understood as meaning water-insoluble homo- and copolymers which are preferably used in the form of dispersions or emulsions.

In the context of the present invention, the term degraded starch is understood as meaning starches which have an average molecular weight Mw of from 1000 to 65 000.

The latex preferably comprises at least 40% by weight, preferably at least 60% by weight, particularly preferably at least 80% by weight, of so-called main monomers (a).

The main monomers (a) are selected from $C_1$-$C_{20}$-alkyl (meth)acrylates, vinyl esters of carboxylic acids comprising up to 20 carbon atoms, vinylaromatics having up to 20 carbon atoms, ethylenically unsaturated nitriles, vinyl halides, vinyl ethers of alcohols comprising 1 to 10 carbon atoms, aliphatic hydrocarbons having 2 to 8 carbon atoms and one or two double bonds or mixtures of these monomers.

For example, alkyl (meth)acrylates having a $C_1$-$C_{10}$-alkyl radical, such as methyl methacrylate, methyl acrylate, n-butyl acrylate, isobutyl acrylate, ethyl acrylate and 2-ethylhexyl acrylate may be mentioned.

In particular, mixtures of the alkyl (meth)acrylates are also suitable.

Vinyl esters of carboxylic acids having 1 to 20 carbon atoms are, for example, vinyl laurate, vinyl stearate, vinyl propionate, vinyl versatate and vinyl acetate.

Suitable vinyl aromatic compounds having up to 20 carbon atoms are vinyltoluene, α- and p-methylstyrene, α-butylstyrene and 4-n-butylstyrene, 4-n-decylstyrene and preferably styrene. Examples of ethylenically unsaturated nitriles are acrylonitrile and methacrylonitrile.

The vinyl halides are ethylenically unsaturated compounds substituted by chlorine, fluorine or bromine, preferably vinyl chloride and vinylidene chloride.

For example, vinyl methyl ether or vinyl isobutyl ether may be mentioned as vinyl ethers of alcohols comprising 1 to 10 carbon atoms. Vinyl ethers of alcohols comprising 1 to 4 carbon atoms are preferred.

Ethylene, propylene, butadiene, isoprene and chloroprene may be mentioned as aliphatic hydrocarbons having 2 to 8 carbon atoms and one or two olefinic double bonds.

Preferred main monomers (a) are $C_1$-$C_{20}$-alkyl (meth)acrylates and mixtures of the alkyl (meth)acrylates with vinyl aromatics, in particular styrene (also summarized as polyacrylate latex) or hydrocarbons having two double bonds, in particular butadiene, or mixtures of such hydrocarbons with vinyl aromatics, in particular styrene (also summarized as polybutadiene latex).

In addition to the main monomers (a), the latex may comprise further monomers (b), for example monomers comprising hydroxyl groups, in particular $C_1$-$C_{10}$-hydroxyalkyl (meth)acrylates, and monomers having alkoxy groups, as are obtainable by alkoxylation of monomers comprising hydroxyl groups with alkoxides, in particular ethylene oxide or propylene oxide.

Further monomers (b) are compounds which have at least two double bonds capable of free radical polymerization, preferably from 2 to 6, particularly preferably from 2 to 4, very particularly preferably 2 or 3 and in particular 2. Such compounds are also referred to as crosslinking agents.

The at least two double bonds of the crosslinking agents (b), which double bonds are capable of free radical polymerization, can be selected from the group consisting of (meth)acryloyl, vinyl ether, vinyl ester, allyl ether and allyl ester groups. Examples of crosslinking agents (b) are 1,2-ethanediol di(meth)acrylate, 1,3-propanediol di(meth)acrylate, 1,2-propanediol di(meth)acrylate, 1,4-butanediol di(meth)acrylate, 1,6-hexanediol di(meth)acrylate, neopentylglycol di(meth)acrylate, trimethylolpropanetriol di(meth)acrylate, pentaerythrityl tetra(meth)acrylate, 1,4-butanediol divinyl ether, 1,6-hexanediol divinyl ether, 1,4-cyclohexanediol divinyl ether, divinylbenzene, allyl acrylate, allyl methacrylate, methallyl acrylate, methallyl methacrylate, but-3-en-2-yl (meth)acrylate, but-2-en-1-yl (meth)acrylate, 3-methylbut-2-en-1-yl (meth)acrylate, esters of (meth)acrylic acid with geraniol, citronellol, cinnamyl alcohol, glyceryl mono- or diallyl ether, trimethylolpropane mono- or diallyl ether, ethylene glycol monoallyl ether, diethylene glycol monoallyl ether, propylene glycol monoallyl ether, dipropylene glycol monoallyl ether, 1,3-propanediol monoallyl ether, 1,4-butanediol monoallyl ether and furthermore diallyl itaconate. Allyl acrylate, divinylbenzene, 1,4-butanediol diacrylate and 1,6-hexanediol diacrylate are preferred.

In addition, the anionic latex may comprise further monomers (c), for example monomers having carboxyl groups and salts or anhydrides thereof. For example, acrylic acid, methacrylic acid, itaconic acid, maleic acid or fumaric acid and aconitic acid may be mentioned. The content of ethylenically unsaturated acids in the latex is in general less than 10% by weight. The proportion of these monomers (c) is, for example, at least 1% by weight, preferably at least 2% by weight and particularly preferably at least 3% by weight. The acid groups of the latex can, optionally, be at least partly neutralized before the subsequent use. Preferably, at least 30 mol %, particularly preferably 50-100 mol % of the acid groups are neutralized. Volatile bases, such as ammonia, or non-volatile bases, such as alkali metal hydroxides, in particular sodium hydroxide solution, are suitable as the base.

In a first embodiment of the present invention, the anionic latex consisting of the abovementioned monomers has a glass transition temperature (measured by means of DSC) of from −50 to +50° C., preferably from −50 to +10° C., particularly preferably from −40 to +5° C. and very particularly preferably from −30 to 0° C.

The glass transition temperature $T_g$ is generally known to the person skilled in the art. It means the limit of the glass transition temperature, toward which the latter tends with increasing molecular weight, according to G. Kanig (Kolloid-Zeitschrift & Zeitschrift für Polymere, Vol. 190, page 1, equation 1). The glass transition temperature is determined by the DSC method (Differential Scanning Calorimetry, 20 K/min, midpoint measurement, DIN 53765).

According to Fox (T. G. Fox, Bull. Am. Phys. Soc. 1956 [Ser. II] 1, page 123 and according to Ullmann's Encyclopädie der technischen Chemie, Vol. 19, page 18, 4th edition, Verlag Chemie, Weinheim, 1980), the following is a good approximation for the glass transition temperature of at most weakly crosslinked copolymers:

$$1/T_g = x^1/T_g^1 + x^2/T_g^2 + \ldots x^n/T_g^n,$$

in which $x^1, x^2, \ldots x^n$ are the mass fractions of the monomers 1, 2, ... n and $T_g^1, T_g^2, \ldots T_g^n$ are the glass transition temperatures of the polymers composed in each case only of one of the monomers 1, 2, ... n, in degrees Kelvin. The $T_g$ values for the homopolymers of most monomers are known and are listed, for example, in Ullmann's Encyclopedia of Industrial Chemistry, Part 5, Vol. A21, page 169, VCH Weinheim, 1992. Further sources of glass transition temperatures of homopolymers are, for example, J. Brandrup, E. H. Immergut, Polymer Handbook, 1st Ed., J. Wiley, New York, 1966, 2nd Ed., J. Wiley, New York, 1975, and 3rd Ed., J. Wiley, New York, 1989.

With the aid of the abovementioned literature, the person skilled in the art knows how to obtain anionic latices having the corresponding glass transition temperature by the choice of the monomers.

Preferably used anionic latices of this first embodiment are, for example, aqueous dispersions of
(1) styrene and/or acrylonitrile or methacrylonitrile,
(2) acrylates and/or methacrylates of $C_1$- to $C_{10}$-alcohols and optionally (3) acrylic acid, methacrylic acid, maleic acid and/or itaconic acid.

Aqueous dispersions of anionic latices of
(1) styrene and/or acrylonitrile,
(2) acrylates of to $C_1$- to $C_4$-alcohols and optionally
(3) acrylic acid
are particularly preferred.

For example, such particularly preferred polyacrylate latices comprise 2-20% by weight of styrene, 2-20% by weight of acrylonitrile, 60-95% by weight of $C_1$-$C_4$-alkyl acrylates, preferably $C_4$-acrylates, such as n-butyl acrylate, isobutyl acrylate and/or tert-butyl acrylate, and 0-5% by weight of acrylic acid.

In a second embodiment of the present invention, the anionic latex comprises, in addition to the abovementioned monomers, at least one monomer comprising phosphonic and/or phosphoric acid groups incorporated in the form of polymerized units, it being possible for these to be both monomers having a free acid group and salts, esters and/or anhydrides thereof.

Preferably used monomers comprising phosphonic and/or phosphoric acid groups are those which are obtainable by esterification of monoethylenically unsaturated $C_3$-$C_8$-carboxylic acids with optionally monoalkoxylated phosphonic and/or phosphoric acids. Optionally monoalkoxylated monomers which comprise phosphoric acid groups and are obtainable by esterification of monoethylenically unsaturated $C_3$-$C_8$-carboxylic acids with optionally monoalkoxylated phosphoric acids of the general Formula (I)

$$H\!-\![X]_n\!-\!P(O)(OH)_2 \qquad (I)$$

in which
X is a straight-chain or branched $C_2$-$C_6$-alkylene oxide unit and
n is an integer from 0 to 20,
are particularly preferred.

Preferably used monoalkoxylated phosphoric acids of the Formula (I) are those in which X is a straight-chain or branched $C_2$-$C_3$-alkylene oxide unit and n is an integer from 5 to 15. X is particularly preferably an ethylene oxide or propylene oxide unit, particularly preferably a propylene oxide unit.

Of course, it is also possible to use any mixtures of different optionally monoalkoxylated phosphonic acids and optionally monoalkoxylated phosphoric acids of the Formula (I) for the esterification with a monoethylenically unsaturated $C_3$-$C_8$-carboxylic acid. Mixtures of monoalkoxylated phosphoric acids of the Formula (I) which comprise the same alkylene oxide unit, preferably propylene oxide, but have a different degree of alkoxylation, preferably degree of propoxylation, are preferably used. Particularly preferred mixtures of monoalkoxylated phosphoric acids comprise 5-15 units of propylene oxide, i.e. n is an integer from 5 to 15.

For the preparation of the monomers comprising phosphonic and/or phosphoric acid groups, monoethylenically unsaturated carboxylic acids having 3 to 8 carbon atoms are esterified with the abovementioned optionally monoalkoxylated phosphonic and/or phosphoric acids, preferably with the optionally monoalkoxylated phosphoric acids of the general Formula (I). Such monoethylenically unsaturated $C_3$-$C_8$-carboxylic acids are, for example, acrylic acid, methacrylic acid, dimethacrylic acid, ethacrylic acid, maleic acid, citraconic acid, methylenemalonic acid, crotonic acid, fumaric acid, mesaconic acid and itaconic acid. Acrylic acid and methacrylic acid are preferably used.

Of course, it is also possible to use mixtures of monoethylenically unsaturated $C_3$-$C_8$-carboxylic acids for the esterification with optionally monoalkoxylated phosphonic and/or phosphoric acids, preferably with optionally monoalkoxylated phosphoric acids of the Formula (I). However, preferably only one monoethylenically unsaturated carboxylic acid, for example acrylic acid or methacrylic acid, is used.

Preferably used anionic latices of the second embodiment are, for example, aqueous dispersions of
(1) styrene and/or acrylonitrile or methacrylonitrile,
(2) acrylates and/or methacrylates of $C_1$- to $C_{10}$-alcohols and optionally
(3) acrylic acid, methacrylic acid, maleic acid and/or itaconic acid and
(4) (meth)acrylates of optionally monoalkoxylated phosphoric acids of the Formula (I), in which X and n have the abovementioned meaning.

Aqueous dispersions of anionic latices of
(1) styrene and/or acrylonitrile,
(2) acrylates of $C_1$- to $C_4$-alcohols and optionally
(3) acrylic acid and
(4) (meth)acrylates of monoalkoxylated phosphoric acids of the Formula (I), in which X is a propylene oxide unit and n is an integer from 5 to 15,
are particularly preferred.

For example, such particularly preferred polyacrylate latices comprise 2-25% by weight of styrene, 2-25% by weight of acrylonitrile, 50-95% by weight of $C_1$-$C_4$-alkyl acrylates, preferably $C_4$-acrylates, such as n-butyl acrylate, isobutyl acrylate and/or tert-butyl acrylate, 0-5% by weight of acrylic acid and 0.1-5% by weight of (meth)acrylates of monoalkoxylated phosphoric acids of the Formula (I), in which X is a propylene oxide unit and n is an integer from 5 to 15.

Usually, the glass transition temperature (measured by means of DSC) of the anionic latices of the second embodiment is in the range from −40 to +50° C. Preferably, anionic latices having a glass transition temperature of from −20 to +20° C. and particularly preferably from −10 to +10° C. are used in the aqueous slurries, according to the invention, of finely divided fillers.

The preparation of the anionic latices is effected independently of the abovementioned two embodiments, as a rule by emulsion polymerization; the polymer is therefore an emulsion polymer. The preparation of aqueous polymer dispersions by the free radical emulsion polymerization process is known per se (cf. Houben-Weyl, Methoden der organischen Chemie, Volume XIV, Makromolekulare Stoffe, loc. cit., page 133 et seq.).

In the emulsion polymerization for the preparation of the latices, ionic and/or nonionic emulsifiers and/or protective colloids or stabilizers are used as surface-active compounds. The surface-active substance is usually used in amounts of 0.1 to 10% by weight, in particular from 0.2 to 3% by weight, based on the monomers to be polymerized.

Customary emulsifiers are, for example, ammonium or alkali metal salts of higher fatty alcohol sulfates, such as sodium n-laurylsulfate, fatty alcohol phosphates, ethoxylated $C_8$- to $C_{10}$-alkylphenols having a degree of ethoxylation of from 3 to 30 and ethoxylated $C_8$- to $C_{25}$-fatty alcohols having a degree of ethoxylation of from 5 to 50. Mixtures of nonionic and ionic emulsifiers are also conceivable. Furthermore, ethoxylated and/or propoxylated alkylphenols and/or fatty alcohols containing phosphate or sulfate groups are suitable. Further suitable emulsifiers are listed in Houben-Weyl, Methoden der organischen Chemie, Band XIV, Makromolekulare Stoffe, Georg Thieme Verlag, Stuttgart, 1961, pages 192 to 209.

Water-soluble initiators for the emulsion polymerization for the preparation of the latices are, for example, ammonium and alkali metal salts of peroxodisulfuric acid, e.g. sodium peroxodisulfate, hydrogen peroxide or organic peroxides, e.g. tert-butyl hydroperoxide. So-called reduction-oxidation (redox) initiator systems are also suitable.

The amount of the initiators is in general from 0.1 to 10% by weight, preferably from 0.5 to 5% by weight, based on the monomers to be polymerized. It is also possible to use a plurality of different initiators in the emulsion polymerization.

In the emulsion polymerization, it is possible to use chain-transfer agents, for example in amounts of from 0 to 3 parts by weight, based on 100 parts by weight of the monomers to be polymerized, by means of which the molar mass is reduced. For example, compounds having a thiol group, such as tert-butyl mercaptan, thioglycolic acid ethyl acrylate, mercaptoethynol, merceptopropyltrimethoxysilane or tert-dodecyl mercaptan, or chain-transfer agents without a thiol group, in particular, for example, terpinolene, are suitable.

The emulsion polymerization for the preparation of the latices is effected as a rule at from 30 to 130° C., preferably at from 50 to 100° C. The polymerization medium may be either only water or mixtures of water and liquids miscible therewith, such as methanol. Preferably, only water is used. The emulsion polymerization can be carried out either as a batch process or in the form of a feed process, including step or gradient procedure. The feed process in which a part of the polymerization batch is initially taken, heated to the polymerization temperature and prepolymerized and the remainder of the polymerization batch is then fed to the polymerization zone continuously, stepwise or with superposition of a concentration gradient while maintaining the polymerization, usually via a plurality of spatially separate feeds, one or more of which comprise the monomers in pure or in emulsified form. In the polymerization, for example, a polymer seed may also be initially taken for establishing the particle size.

The manner in which the initiator is added to the polymerization vessel in the course of the free radical aqueous emulsion polymerization is known to the average person skilled in the art. It can be either initially taken completely in the polymerization vessel or used continuously or stepwise at the rate of its consumption in the course of the free radical aqueous emulsion polymerization. Specifically, this depends on the chemical nature of the initiator system as well as on the polymerization temperature. Preferably, a part is initially taken and the remainder is fed to the polymerization zone at the rate of consumption.

For removing the residual monomers, initiator is usually added also after the end of the actual emulsion polymerization, i.e. after a monomer conversion of at least 95%.

The individual components can be added to the reactor in the feed process from above, at the side or from below through the reactor base.

After the copolymerization, the acid groups present in the latex can also be at least partly neutralized. This can be effected, for example, with oxides, hydroxides, carbonates or bicarbonates of alkali metals or alkaline earth metals, preferably with hydroxides with which any counterion or a plurality thereof may be associated, e.g. $Li^+$, $Na^+$, $K^+$, $Cs^+$, $Mg^{2+}$, $Ca^{2+}$ or $Ba^{2+}$. Ammonia or amines are furthermore suitable for the neutralization. Aqueous ammonium hydroxide, sodium hydroxide or potassium hydroxide solutions are preferred.

In the emulsion polymerization, aqueous dispersions of the latex, as a rule having solids contents of from 15 to 75% by weight, preferably from 40 to 75% by weight, are obtained.

The particle size of the latices is preferably in the range from 10 to 1000 nm, particularly preferably in the range from 50 to 300 nm (measured using a Malvern® Autosizer 2 C).

The aqueous slurries, according to the invention, of finely divided fillers are obtained by treating a filler slurry with an aqueous dispersion comprising at least one anionic latex and at least one degraded starch. As described above, the degraded starches have an average molecular weight Mw of from 1000 to 65 000. The average molecular weights Mw of the degraded starches can easily be determined by methods known to the person skilled in the art, for example by means of gel permeation chromatography with the use of a multi-angle scattered light detector.

In order to obtain such a starch, it is possible to start from all starch types, for example from native, anionic, cationic or amphoteric starch. The starch may originate, for example, from potatoes, corn, wheat, rice, tapioca or sorghum or may be waxy starches which have an amylopectin content of >80, preferably >95, % by weight, such as waxy corn starch or waxy potato starch. The starches may be anionically and/or cationically modified, esterified, etherified and/or crosslinked. Cationized starches are preferred.

If the molecular weight Mw of the starches is not already in the range from 1000 to 65 000, they are subjected to a decrease in molecular weight. This decrease in molecular weight can be carried out oxidatively, thermally, acidolytically or enzymatically. A procedure in which a starch is enzymatically and/or oxidatively degraded is preferred. The molar mass Mw of the degraded starch is preferably in the range from 2500 to 35 000.

The use of anionic or cationic starches is particularly preferred. Such starches are known. Anionic starches are obtainable, for example, by oxidation of native starches. Cationic starches are prepared, for example, by reacting native starch with at least one quarternizing agent, such as 2,3-epoxypropyltrimethylammonium chloride. The cationized starches comprise quaternary ammonium groups.

The proportion of cationic or anionic groups in substituted starch is stated with the aid of the degree of substitution (DS). It is, for example, from 0.005 to 1.0, preferably from 0.01 to 0.4.

It is possible to use a single degraded starch or mixtures of two or more degraded starches.

In a particularly preferred form, maltodextrins are used as the degraded starch. In the context of the present invention, maltodextrins are water-soluble carbohydrates which are obtained by enzymatic degradation of starch, consist of glucose units and have one dextrose equivalent.

The aqueous dispersions used for the preparation of the aqueous slurries, according to the invention, of finely divided fillers and comprising at least one anionic latex and at least one degraded starch can be prepared in various ways. For example, the degraded starch can be introduced in solid form or in solution in water into an aqueous dispersion of the ionic latex and mixed. Alternatively, the emulsion polymerization for the preparation of the anionic latex can also be effected in the presence of the degraded starch.

The aqueous dispersions comprising at least one anionic latex and at least one degraded starch are used, according to the invention, for the treatment of finely divided fillers. Suitable fillers are all pigments which can usually be used in the paper industry and comprise inorganic material, e.g. calcium carbonate, which can be used in the form of ground calcium carbonate (GCC), chalk, marble or precipitated calcium carbonate (PCC), talc, kaolin, bentonite, satin white, calcium sulfate, barium sulfate or titanium dioxide. It is also possible to use mixtures of two or more pigments, but one pigment is preferably used. The mean particle diameter is, for example, in the range from 0.5 to 30 µm, preferably from 1 to 10 µm.

The present invention also relates to a process for the preparation of the aqueous slurry of finely divided fillers.

The fillers are processed, for example, by introduction into water to give an aqueous slurry. Precipitated calcium carbonate is usually suspended in water in the absence of dispersants. In order to prepare aqueous slurries of the customary fillers, as a rule an anionic dispersant, e.g. polyacrylic acids having a molar mass $M_w$, of, for example, from 1000 to 40 000, is used. If an anionic dispersant is used, for example, from 0.01 to 0.5% by weight, preferably from 0.2 to 0.3% by weight, thereof is used for the preparation of the aqueous filler slurries. The finely divided fillers dispersed in water in the presence of anionic dispersants are anionic. The aqueous slurries particularly preferably comprise from 10 to 40% by weight of at least one filler.

In order to prepare the aqueous slurries, according to the invention, of finely divided fillers, aqueous slurries of finely divided fillers, optionally anionically dispersed, are treated with an aqueous dispersion comprising at least one anionic latex and at least one degraded starch. For example, from 0.01 to 10% by weight of an aqueous dispersion comprising at least one anionic latex and at least one degraded starch, solids content of the aqueous dispersion based on the filler, can be added to an aqueous slurry comprising from 1 to 70% by weight of at least one finely divided filler or an aqueous slurry of a finely divided filler can be introduced into an aqueous dispersion comprising at least one anionic latex and at least one degraded starch and the components are mixed in each case. It is also possible for the finely divided filler to be introduced in solid form into an aqueous dispersion comprising at least one anionic latex and at least one degraded starch. The treatment of the aqueous slurries of finely divided fillers with the aqueous dispersions comprising anionic latices and degraded starches can be carried out continuously or batchwise. On combination of the finely divided fillers with the aqueous dispersions comprising anionic latices and degraded starches, the fillers are at least partly coated or impregnated with anionic latices. The mixing of the components is effected, for example, in a shear field. In general, it is sufficient if the components are stirred after combination or are treated in a shear field of an UltraTurrax device. The combination and mixing of the constituents of the aqueous slurries can be effected, for example, in the temperature range from 0° C. to 95° C., preferably from 10 to 70° C. In general, the components are mixed at the respective room temperature to a temperature of 40° C. The pH of the aqueous slurries of fillers which have been treated with anionic latices is, for example, from 5 to 11, preferably from 6 to 9, the pH of slurries comprising calcium carbonate preferably being more than 6.5.

The preparation of the aqueous slurries, according to the invention, of finely divided fillers by the treatment with the aqueous dispersion comprising at least one anionic latex and at least one degraded starch is effected as a rule at room temperature. However, in some cases it may be advantageous to carry out the treatment by supplying heat. For example, the aqueous slurry of finely divided fillers can be heated at a temperature of at least 40° C., preferably of at least 45° C. and particularly preferably of at least 50° C. during the addition of the aqueous dispersion comprising at least one anionic latex and at least one degraded starch (in each case at atmospheric pressure). It is also possible for the aqueous slurry of finely divided fillers to be brought to a temperature of at least 40° C., preferably of at least 45° C., and particularly preferably of at least 50° C. by heating before the addition of the aqueous dispersion comprising at least one anionic latex and at least one degraded starch (in each case at atmospheric pressure). The heating of the aqueous slurry of finely divided fillers can be effected by active heating, i.e. by supply of energy, but also by the heat of reaction liberated during the preparation of the filler slurry. Alternatively, the treatment of an aqueous slurry of finely divided fillers with the aqueous dispersion comprising at least one anionic latex and at least one degraded starch can also be effected at room temperature, the heating of the aqueous slurries according to the invention then being effected to temperatures of at least 40° C., preferably at least 45° C. and particularly preferably at least 50° C. (in each case at atmospheric pressure). The addition of a dispersion heated to at least 40° C., preferably at least 45° C., particularly preferably at least 50° C. (in each case at atmospheric pressure), and comprising at least one anionic latex and at least one degraded starch to an aqueous slurry of finely divided fillers which is at room temperature or has been heated is also possible. During the heating of the respective components, the boiling point (at atmospheric pressure) of the aqueous slurries or aqueous dispersions must not of course be exceeded.

Particularly preferably, aqueous slurries of precipitated calcium carbonate which is free of dispersants and of ground calcium carbonate which is obtainable by milling of calcium carbonate or marble in the form of lumps in the presence of anionic polymeric dispersants, such as polyacrylic acids having molar masses of from 1000 to 15 000, are particularly preferably prepared.

The invention furthermore relates to the use of the aqueous slurries as an additive to the paper stock in the production of filler-containing paper, filler-containing cardboard or filler-containing board by draining the paper stock.

The aqueous pigment slurries treated with an anionic latex and degraded starch can be used for the production of all filler-containing paper qualities, for example newsprint, SC paper (supercalendared paper), wood-free or wood-containing writing and printing papers. For the production of such papers, for example, groundwood, thermomechanical pulp (TMP), chemothermomechanical pulp (CTMP), pressure groundwood (PGW) and sulfite and sulfate pulp are used as main raw material components. By using the aqueous slurries according to the invention, the filler content of the paper can be substantially increased with virtually unchanged strength properties. Such papers have strength properties which are comparable with those of conventional papers having a low solids content.

The aqueous slurries, according to the invention, of finely divided fillers are mixed with the fiber during paper making in order thus to form the total paper stock. In addition to the treated fillers and fibers, the total stock may also comprise other conventional paper additives. These include, for example, sizes, such as alkylketene dimers (AKD), alkenylsuccinic anhydrides (ASA), rosin size, wet strength agents, cationic or anionic retention aids based on synthetic polymers. Suitable retention aids are, for example, anionic microparticles (colloidal silica, bentonite), anionic polyacrylamides, cationic polyacrylamides, cationic starch, cationic polyethylenimine or cationic polyvinylamine. In addition, any combinations thereof are conceivable, for example dual systems which consist of a cationic polymer with an anionic microparticle or an anionic polymer with a cationic microparticle. In order to achieve a high filler retention, it is advisable to add such retention aids, which can be added, for example, to the high-consistency stock or to the low-consistency stock.

The invention is explained in more detail with reference to the following, nonlimiting examples.

EXAMPLES

The percentages stated in the examples are percent by weight, unless evident otherwise from the context.

Polymer 1

411.6 g of demineralized water, 14.6 g of a polystyrene seed (solids content 33%, mean particle size 29 nm) and 1.4 g of a 45% strength by weight solution of dodecylphenoxybenzenedisulfonic acid sodium salt (Dowfax® 2A1, Dow Chemicals) and 15.4 g of a 7% strength by weight solution of sodium peroxodisulfate were initially taken in a 4 l vessel equipped with an anchor stirrer and having a plane-ground joint. Via a regulated, external oil bath, the reaction vessel was heated to 93° C. with stirring. After this temperature had been reached, a previously prepared monomer emulsion consisting of 534.4 g of demineralized water, 22.4 g of a 15% strength by weight solution of sodium lauryl sulfate (Disponil® SDS 15, Cognis), 8 g of a 45% strength by weight solution of dodecylphenoxybenzenedisulfonic acid sodium salt (Dowfax® 2A1, Dow Chemicals), 12 g of a 10% strength by weight solution of sodium hydroxide, 35 g of acrylic acid, 168 g of styrene, 829 g of n-butyl acrylate and 168 g of acrylonitrile was metered in uniformly in the course of 2 hours and 45 minutes. At the same time 49.7 g of a 7% strength by weight solution of sodium peroxodisulfate were metered in. The batch was stirred for a further 45 minutes while keeping the temperature constant. Thereafter, 93.6 g of a 10% strength by weight solution of sodium hydroxide were added and the reaction content was cooled to 60° C. Two feeds consisting of a) 24 g of a 10% strength by weight solution of tert-butyl hydroperoxide and b) 33 g of a 13% strength by weight solution comprising the adduct of 2.67 g of sodium disulfite and 1.62 g of acetone were then metered in simultaneously in the course of 30 minutes. The reactor content was cooled to room temperature.

A virtually coagulum-free polymer dispersion having a solids content of 51% by weight was obtained. The polymer had a glass transition temperature, measured via DSC, of +5° C.

By adding 810 g of demineralized water, the solids content was reduced to 30% by weight. 404 g of a 30% by weight solution of a maltodextrin (from Cargill, MD® 09015) were then mixed in.

The mixture obtained had a solids content of 30% by weight and a pH of 6.5.

Polymer 2

Polymer 2 was prepared analogously to polymer 1 but a maltodextrin solution diluted to 30% by weight (from Cerestar, Stärke 019 S1) was used during the mixing.

Polymer 3

411.6 g of demineralized water, 14.6 g of a polystyrene seed (solids content 33%, mean particle size 29 nm) and 1.4 g of a 45% strength by weight solution of dodecylphenoxybenzenedisulfonic acid sodium salt (Dowfax® 2A1, Dow Chemicals) and 15.4 g of a 7% strength by weight solution of sodium peroxodisulfate were initially taken in a 4 l vessel equipped with an anchor stirrer and having a plane-ground joint. Via a regulated, external oil bath, the reaction vessel was heated to 93° C. with stirring. After this temperature had been reached, a previously prepared monomer emulsion consisting of 534.4 g of demineralized water, 22.4 g of a 15% strength by weight solution of sodium lauryl sulfate (Disponil® SDS 15, Cognis), 8 g of a 45% strength by weight solution of dodecylphenoxybenzenedisulfonic acid sodium salt (Dowfax® 2A1, Dow Chemicals), 12 g of a 10% strength by weight solution of sodium hydroxide, 36 g of acrylic acid, 60 g of styrene, 1044 g of n-butyl acrylate and 60 g of acrylonitrile was metered in uniformly in the course of 2 hours. At the same time 49.8 g of a 7% strength by weight solution of sodium peroxodisulfate were metered in 2.5 hours. The batch was stirred for a further 45 minutes while keeping the temperature constant. Thereafter, 93.6 g of a 10% strength by weight solution of sodium hydroxide were added and the reaction content was cooled to 60° C. Two feeds consisting of a) 24 g of a 10% strength by weight solution of tert-butyl hydroperoxide and b) 33 g of a 13% strength by weight solution comprising the adduct of 2.67 g of sodium disulfite and 1.62 g of acetone were then metered in simultaneously in the course of 30 minutes. The reactor content was cooled to room temperature.

A virtually coagulum-free polymer dispersion having a solids content of 50% by weight was obtained. The polymer had a glass transition temperature, measured via DSC, of −25° C.

By adding 810 g of demineralized water, the solids content was reduced to 30% by weight. 404 g of a 30% by weight solution of a maltodextrin (from Cargill, MD® 09015) were then mixed in.

The mixture obtained had a solids content of 30% by weight and a pH of 6.4.

Polymer 4

340.8 g of demineralized water, 14.6 g of a polystyrene seed (solids content 33%, mean particle size 29 nm) and 1.4 g of a 45% strength by weight solution of dodecylphenoxybenzenedisulfonic acid sodium salt (Dowfax® 2A1, Dow Chemicals) and 15.4 g of a 7% strength by weight solution of sodium peroxodisulfate were initially taken in a 4 l vessel equipped with an anchor stirrer and having a plane-ground joint. Via a regulated, external oil bath, the reaction vessel was heated to 93° C. with stirring. After the temperature had been reached, a previously prepared monomer emulsion consisting of 483.6 g of demineralized water, 22.4 g of a 15% strength by weight solution of sodium laurylsulfate (Disponil® SDS 15, Cognis), 8 g of a 45% strength by weight solution of dodecylphenoxybenzenedisulfonic acid sodium salt (Dowfax® 2A1, Dow Chemicals), 12 g of a 10% strength by weight solution of sodium hydroxide, 12 g of a methacrylate with an oligopropylene oxide esterified terminally with phosphoric acid (Sipomer® PAM 200: $CH_2=C(CH_3)-COO-(CH_2CH(CH_3)O)_{8-10}-P(O)(OH)_2$, Rhodia), 24 g of acrylic acid, 168 g of styrene, 828 g of n-butyl acrylate and 168 g of acrylonitrile was metered in uniformly in the course of 2 hours and 45 minutes. Simultaneously therewith, 87 g of a 4% strength by weight solution of sodium peroxodisulfate were metered in. The batch was stirred for a further 45 minutes while keeping the temperature constant. Thereafter, 62.4 g of a 10% strength by weight solution of sodium hydroxide were added and the reaction content was cooled to 60° C. Two feeds consisting of a) 80 g of a 3% strength by weight solution of tert-butyl hydroperoxide and b) 53.4 g of demineralized water with 33 g of a 13% strength by weight solution comprising the adduct of 2.67 g of sodium disulfite and 1.62 g of acetone were then metered in simultaneously in the course of 30 minutes. The reactor content was cooled to room temperature.

A virtually coagulum-free polymer dispersion having a solids content of 50% by weight was obtained. The polymer had a glass transition temperature, measured via DSC, of +4° C.

By adding 810 g of demineralized water, the solids content was reduced to 30% by weight. 404 g of a 30% by weight solution of a maltodextrin (from Cargill, MD® 09015) were then mixed in.

The mixture obtained had a solids content of 30% by weight, a pH of 6.5 and a particle size, measured by dynamic light scattering (Malvern HPPS), of 137 nm.

Polymer 5

1064.6 g of demineralized water, 7.2 g of a polystyrene seed (solids content 33%, mean particle size 29 nm), 0.6 g of a 45% strength by weight solution of dodecylphenoxybenzenedisulfonic acid sodium salt (Dowfax® 2A1, Dow Chemicals) and 240.0 g of maltodextrin (from Cargill, MD® 09015) and 7.8 g of a 7% strength by weight solution of sodium peroxodisulfate were initially taken in a 4 l vessel equipped with an anchor stirrer and having a plane-ground joint. Via a regulated, external oil bath, the reaction vessel was heated to 93° C. with stirring. After the temperature had been reached, a previously prepared monomer emulsion consisting of 267.2 g of demineralized water, 11.2 g of a 15% strength by weight solution of sodium lauryl sulfate (Disponil® SDS 15, Cognis), 4 g of a 45% strength by weight solution of dodecylphenoxybenzenedisulfonic acid sodium salt (Dowfax® 2A1, Dow Chemicals), 6 g of a 10% strength by weight solution of sodium hydroxide, 18 g of acrylic acid, 84 g of styrene, 414 g of n-butyl acrylate and 84 g of acrylonitrile were metered in uniformly in the course of 2 hours. Simultaneously therewith, 34.8 g of a 2.5% strength by weight solution of sodium peroxodisulfate were metered in the course of 2.5 hours. The batch was stirred for a further 45 minutes while keeping the temperature constant. Thereafter, 46.8 g of a 10% strength by weight solution of sodium hydroxide were added and the reaction content was cooled to 60° C. Simultaneously, two feeds consisting of a) 30 g of a 2% strength by weight solution of tert-butyl hydroperoxide and b) 55.6 g of demineralized water with 16.4 g of a 13% strength by weight solution comprising the adduct of 2.67 g of sodium disulfite and 1.62 g of acetone were then metered in the course of 30 minutes. The reactor content was cooled to room temperature.

A virtually coagulum-free polymer dispersion having a solids content of 29.3% by weight, and a pH of 6.1 was obtained. The polymer had a glass transition temperature, measured via DSC, of +5° C. The particle size, measured by dynamic light scattering (Malvern HPPS), was 149 nm.

Comparative Polymer 1

411.7 g of demineralized water, 14.5 g of a polystyrene seed (solids content 33%, mean particle size 29 nm) and 1.4 g of a 45% strength by weight solution of dodecylphenoxybenzenedisulfonic acid sodium salt (Dowfax® 2A1, Dow Chemicals) and 15.4 g of a 7% strength by weight solution of sodium peroxodisulfate were initially taken in a 4 l vessel equipped with an anchor stirrer and having a plane-ground joint. Via a regulated, external oil bath, the reaction vessel was heated to 93° C. with stirring. After the temperature had been reached, a previously prepared monomer emulsion consisting of 534.2 g of demineralized water, 22.4 g of a 15% strength by weight solution of sodium lauryl sulfate (Disponil® SDS 15, Cognis), 8 g of a 45% strength by weight solution of dodecylphenoxybenzenedisulfonic acid sodium salt (Dowfax® 2A1, Dow Chemicals), 12 g of a 10% strength by weight solution of sodium hydroxide, 36 g of acrylic acid, 60 g of styrene, 1044 g of n-butyl acrylate and 60 g of acrylonitrile was metered in uniformly in the course of 2 hours. Simultaneously therewith, 49.7 g of a 7% strength by weight solution of sodium peroxodisulfate were metered in. The batch was stirred for a further 45 minutes while keeping the temperature constant. Thereafter, 93.6 g of a 10% strength by weight solution of sodium hydroxide were added and the reaction content was cooled to 60° C. Simultaneously, two feeds consisting of a) 24 g of a 10% strength by weight solution of tert-butyl hydroperoxide and b) 33 g of a 13% strength by weight solution comprising the adduct of 2.67 g of sodium disulfite and 1.62 g of acetone were then metered in the course of 30 minutes. The reactor content was cooled to room temperature.

A virtually coagulum-free polymer dispersion having a solids content of 50.2% by weight, a pH of 7.5 and a particle size, measured by dynamic light scattering (Malvern HPPS), of 172 nm was obtained. The polymer had a glass transition temperature, measured via DSC, of −25° C.

Example 1

First, 3 g of a 30% strength by weight dispersion of the polymer 1 were mixed with 150 g of a 20% strength by weight slurry of precipitated calcium carbonate (PCC) with gentle stirring at room temperature. During the addition and thereafter, the mixture was stirred with the aid of a Heiltof stirrer at 1000 revolutions per minute (rpm). The pH of the mixture was then adjusted to 8.5.

Example 2

First, 3 g of a 30% strength by weight dispersion of the polymer 2 were mixed with 150 g of a 20% strength by weight slurry of precipitated calcium carbonate (PCC) with gentle stirring at room temperature. During the addition and thereafter, the mixture was stirred with the aid of a Heiltof stirrer at 1000 revolutions per minute (rpm). The pH of the mixture was then adjusted to 8.5.

Example 3

First, 3 g of a 30% strength by weight dispersion of the polymer 3 were mixed with 150 g of a 20% strength by weight slurry of precipitated calcium carbonate (PCC) with gentle stirring at room temperature. During the addition and thereafter, the mixture was stirred with the aid of a Heiltof stirrer at 1000 revolutions per minute (rpm). The pH of the mixture was then adjusted to 8.5.

Example 4

First, 3 g of a 30% strength by weight dispersion of the polymer 4 were mixed with 150 g of a 20% strength by weight slurry of precipitated calcium carbonate (PCC) with gentle stirring at room temperature. During the addition and thereafter, the mixture was stirred with the aid of a Heiltof stirrer at 1000 revolutions per minute (rpm). The pH of the mixture was then adjusted to 8.5.

Example 5

First, 3 g of a 30% strength by weight dispersion of the polymer 5 were mixed with 150 g of a 20% strength by weight slurry of precipitated calcium carbonate (PCC) with gentle stirring at room temperature. During the addition and thereafter, the mixture was stirred with the aid of a Heiltof stirrer at 1000 revolutions per minute (rpm). The pH of the mixture was then adjusted to 8.5.

Comparative Example (CE) 1

First, 3 g of a 30% strength by weight dispersion of the comparative polymer 1 were mixed with 150 g of a 20% strength by weight slurry of precipitated calcium carbonate (PCC) with gentle stirring at room temperature. During the addition and thereafter, the mixture was stirred with the aid of a Heiltof stirrer at 1000 revolutions per minute (rpm). The pH of the mixture was then adjusted to 8.5.

Production of Filler-Containing Paper

Examples 6-20

Comparative Examples 2-7

A mixture of bleached birch sulfate and bleached pine sulfite was beaten spec-free in the ratio of 70/30 at a solids concentration of 4% until a freeness of 30-35 was reached. An optical brightener (Blankophor® PSG, Kemira Oy) and a cationic starch (HiCat® 5163 A) were then added to the beaten stock. The digestion of the cationic starch was effected as a 10% strength by weight starch slurry in a jet digester at 130° C. and with a residence time of 1 minute. The amount of optical brightener metered was 0.5% by weight of commercial product, based on the solids content of the paper stock suspension. The amount of cationic starch metered was 0.5% by weight of starch, based on the solids content of the paper stock suspension. The pH of the stock was in the range from 7 to 8. The beaten stock was then diluted to a solids concentration of 0.35% by weight by addition of water.

In order to determine the behavior of the aqueous filler slurries described above in the production of filler-containing paper, in each case 500 ml of the paper stock suspension was initially taken and in each case the slurries treated according to the examples and a cationic polyacrylamide as a retention aid (Polymin® KE 540, BASF Aktiengesellschaft) were metered into this pulp. The amount of retention aid metered was in each case 0.01% by weight of polymer, based on the solids content of the paper stock suspension.

Sheets were then formed with the pretreated fillers described above (examples 6-20 and comparative examples 2-4). The amount of filler used for this purpose was adapted so that the filler contents were about 20%, 30% or 40%. In the case of the pretreated fillers, the amount of slurry which must be used in order to achieve a certain target value is always lower than in the case of the untreated fillers.

In addition, comparative examples were carried out with untreated filler for each of the pretreated filler types (comparative examples 5-7). For this purpose, the amount of untreated filler slurry which is necessary to establish a filler content of about 20%, 30% or 40% was first determined in preliminary experiments. Sheets were then formed with the untreated fillers.

The paper sheets were produced in each case on a Rapid-Köthen sheet former according to ISO 5269/2 with a sheet weight of 70 g/m² and then dried for 7 minutes at 90° C.

Testing of the Paper Sheets

After being stored in a conditioned chamber at a constant 23° C. and 50% relative humidity for 12 hours, the dry breaking length of the sheets according to DIN 54540, the internal strength according to DIN 54516 and the bending stiffness according to DIN 53121 were determined. The results are stated in Table 1. The slurries corresponding to the comparative examples or the comparative examples with the paper sheets produced therefrom are identified by the addition (CE). The other examples are examples according to the invention.

TABLE 1

Testing of the paper sheets

| Example or comparative example (CE) | Slurry according to example or comparative example (CE) | Filler content [%] | Dry breaking length [m] | Internal strength [N] | Bending stiffness [mN] |
|---|---|---|---|---|---|
| 6  | 1 | 20.1 | 5781 | 354 | 70.1 |
| 7  | 1 | 29.5 | 4921 | 301 | 53.3 |
| 8  | 1 | 39.3 | 4045 | 254 | 39.2 |
| 9  | 2 | 20.9 | 5845 | 348 | 69.4 |
| 10 | 2 | 29.1 | 4911 | 299 | 53.9 |
| 11 | 2 | 40.7 | 3934 | 251 | 38.3 |
| 12 | 3 | 19.8 | 5912 | 358 | 70.5 |
| 13 | 3 | 30.2 | 5055 | 291 | 54.5 |
| 14 | 3 | 40.9 | 4123 | 247 | 40.1 |
| 15 | 4 | 20.1 | 5801 | 339 | 71.8 |
| 16 | 4 | 29.2 | 5012 | 285 | 53.5 |
| 17 | 4 | 40.2 | 3945 | 239 | 39.7 |
| 18 | 5 | 20.6 | 5734 | 363 | 71.3 |
| 19 | 5 | 30.1 | 4819 | 312 | 55.1 |
| 20 | 5 | 39.1 | 3945 | 265 | 40.4 |
| CE 2 | CE 1 | 20.8 | 5212 | 287 | 69.1 |
| CE 3 | CE 1 | 30.4 | 4378 | 239 | 52.1 |
| CE 4 | CE 1 | 39.2 | 3619 | 188 | 37.7 |
| CE 5 | PCC without pretreatment | 20.2 | 4276 | 157 | 67.2 |
| CE 6 | PCC without pretreatment | 30.7 | 3321 | 109 | 51.3 |
| CE 7 | PCC without pretreatment | 39.8 | 2467 | 71 | 35.9 |

The invention claimed is:

1. An aqueous slurry of finely divided fillers which are at least partly coated with anionic latices, wherein the slurry is obtained by a process comprising treating an aqueous slurry of finely divided fillers with an aqueous dispersion comprising at least one anionic latex and at least one degraded starch, wherein said at least one anionic latex comprises at least one monomer comprising phosphoric acid groups incorporated in the form of polymerized units.

2. The aqueous slurry according to claim 1, wherein the glass transition temperature of the anionic latex is in the range of −50 to +10° C.

3. The aqueous slurry according to claim 1, wherein the monomer which comprises phosphoric acid groups is obtained by a process comprising esterifying a monoethylenically unsaturated $C_3$-$C_8$-carboxylic acid with optionally a monoalkoxylated phosphoric acid of the general Formula (I)

$$H\!-\![X]_n\!-\!P(O)(OH)_2 \qquad (I)$$

in which

X is a straight-chain or branched $C_2$-$C_6$-alkylene oxide unit and n is an integer from 0 to 20.

4. The aqueous slurry according to claim 3, wherein monoalkoxylated phosphoric acid of the Formula (I), in which X is a straight-chain or branched $C_2$-$C_3$-alkylene oxide unit and n is an integer from 5 to 15, is present in the esterification.

5. The aqueous slurry according to claim 3, wherein mixtures of monoalkoxylated phosphoric acid of the Formula (I) having from 5 to 15 units of propylene oxide are present in the esterification.

6. The aqueous slurry according to claim 3, wherein the monoethylenically unsaturated $C_3$-$C_8$-carboxylic acid is acrylic acid, methacrylic acid, dimethylacrylic acid, ethacrylic acid, maleic acid, citraconic acid, methylenemalonic acid, crotonic acid, fumaric acid, mesaconic acid and/or itaconic acid.

7. The aqueous slurry according to claim 6, wherein the monoethylenically unsaturated $C_3$-$C_8$-carboxylic acid is acrylic acid or methacrylic acid.

8. The aqueous slurry according to claim 3, wherein the anionic latices consist of
   (1) styrene and/or acrylonitrile or methacrylonitrile,
   (2) acrylates and/or methacrylates of $C_1$- to $C_{10}$-alcohols and optionally
   (3) acrylic acid, methacrylic acid, maleic acid and/or itaconic acid and
   (4) (meth)acrylates of optionally monoalkoxylated phosphoric acids of the Formula (I), in which X and n have the abovementioned meaning.

9. The aqueous slurry according to claim 8, wherein the anionic latices consist of 2-25% by weight of styrene, 2-25% by weight of acrylonitrile, 50-95% by weight of $C_1$-$C_4$-alkyl acrylates, 0-5% by weight of acrylic acid and 0.1-5% by weight of (meth)acrylates of monoalkoxylated phosphoric acids of the Formula (I), in which X is a propylene oxide unit and n is an integer of from 5 to 15.

10. The aqueous slurry according to claim 1, wherein the degraded starch has an average molecular weight Mw of from 1000 to 65 000.

11. The aqueous slurry according to claim 10, wherein the degraded starch is a maltodextrin.

12. The aqueous slurry according to claim 1, which comprises from 1 to 70% by weight of at least one finely divided filler and from 0.01 to 10% by weight of said at least one anionic latex and said at least one degraded starch, based on the filler.

13. A process for the preparation of an aqueous slurry according to claim 1, comprising adding an aqueous dispersion comprising from 0.01 to 10% by weight of at least one anionic latex and at least one degraded starch, based on the filler, to an aqueous slurry of at least one finely divided filler, or mixing the aqueous slurry of a finely divided filler into an aqueous dispersion comprising at least one anionic latex and at least one degraded starch, or mixing the finely divided filler in solid form into an aqueous dispersion comprising at least one anionic latex and at least one degraded starch.

14. An additive to the paper stock in the production of filler-containing paper, filler-containing cardboard or filler-containing board by draining the paper stock, comprising the aqueous slurry according to claim 1.

15. The aqueous slurry according to claim 1, wherein a ratio of anionic latex to degraded starch is from 30:1 to 1:1.

16. The aqueous slurry according to claim 1, wherein a ratio of anionic latex to degraded starch is from 10:1 to 1:1.

17. The aqueous slurry according to claim 1, wherein a ratio of anionic latex to degraded starch is from 5:1 to 1:1.

\* \* \* \* \*